(12) United States Patent
Naik et al.

(10) Patent No.: US 7,501,141 B2
(45) Date of Patent: Mar. 10, 2009

(54) PROCESS FOR THE PREPARATION OF COLORANT FROM OLEORESIN

(75) Inventors: Jarpla Pura Naik, Mysore (IN); Sathyagalam Ranganatha Desikacharya Sampathu, Mysore (IN); Madeneni Madhava-Naidu, Mysore (IN); Halagur Bogegowda Sowbhagya, Mysore (IN)

(73) Assignee: Council of Scientific and Industrial Research, New Delhi (IN)

( * ) Notice: Subject to any disclaimer, the term of this patent is extended or adjusted under 35 U.S.C. 154(b) by 62 days.

(21) Appl. No.: 10/396,079

(22) Filed: Mar. 25, 2003

(65) Prior Publication Data
US 2004/0191384 A1    Sep. 30, 2004

(51) Int. Cl.
*A23L 1/277* (2006.01)
*A23L 1/28* (2006.01)

(52) U.S. Cl. .................. 426/540; 426/429; 426/430; 426/655

(58) Field of Classification Search ............. 426/540, 426/429, 430, 655
See application file for complete search history.

(56) References Cited

U.S. PATENT DOCUMENTS 5,997,877 A * 12/1999 Chang ................... 424/757

6,326,504 B1 * 12/2001 Piquer et al. ................ 554/11

FOREIGN PATENT DOCUMENTS

JP    6 126 4061    11/1986

OTHER PUBLICATIONS

Kassk, http://web.archive.org/web/20020207202421/http://kassk.com/product.html, Feb. 7, 2002.*
"Paprika Oleoresin," http://web.archive.org/web/20020213101536/http://apps3.fao.org/jecfa/additive_specs/docs/0/additive-0297.htm, Feb. 13, 2002.*
"East Anglian Food Ingredients," http://web.archive.org/web/20021207051055/http://www.eafi.com/oleoresins.asp, Dec. 7, 2002.*

* cited by examiner

*Primary Examiner*—Arthur L Corbin
(74) *Attorney, Agent, or Firm*—Morgan & Finnegan, LLP

(57) ABSTRACT

The present invention relates to a process for the preparation of colorant with enhanced color value from commercially available pungent free chilli oleoresin by extracting the pungent free oleoresin with any one of alcoholic solvent, mixture of alcoholic solvents, mixture of alcohol-ketonic solvent or aqueous ketonic solvent, separating the oleoresin layer and the solvent layer, pooling the solvent layer obtained and separating the final oleoresin layer, and distilling the final oleoresin layer to obtain pungent free oleoresin with enhanced color value.

16 Claims, 1 Drawing Sheet

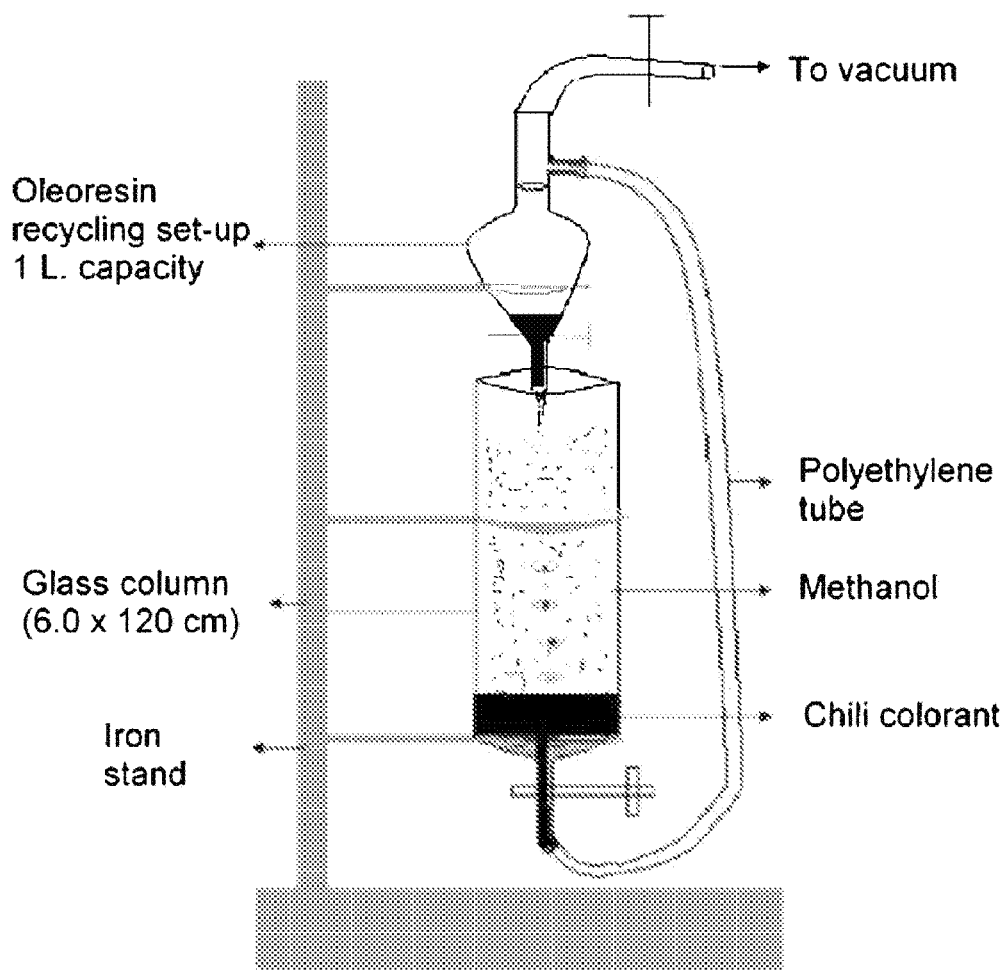
Figure 1 · Experimental set-up for preparation of colorant with High color value from pungency-free chili oleoresin

PROCESS FOR THE PREPARATION OF COLORANT FROM OLEORESIN

FIELD OF THE INVENTION

The present invention relates to a process for the preparation of colorant with enhanced color value from chili oleoresin. In particular the process is to extract the colorant from pungency-free chilli oleoresin and paprika oleoresin

BACKGROUND AND PRIOR ART REFERENCES

Chillies are the dried ripe red fruits of the genus *capsicum*. The two well-known species are *Capsicum annum* L. and *Capsicum frutenscens* L. India is the largest producer and exporter of chillies. The estimated export of dry chillies from India was 75,000 MT tonnes valued Rs 25580 lakhs in 2001- 02.

Pungency and color are the two main quality attributes in chillies. The red color of chillies is due to the presence of carotenoid pigments like capsanthin, (major pigment, 35%) capsorubin, zeaxanthin, violaxanthin, cryptoxanthin, β-carotene etc. These pigments are present in chillies mainly the esterified form, and to a small extent in non-esterified forms. The oleoresin of chillies is used in many processed foods like sausages, seafood, meat products etc. to impart a reddish taint and pungency. It is also used in chicken feed so that chicken meat and yolk will get an attractive reddish shade. As a food colorant pungency-free, high color content chilli oleoresins are desirable. Chilli oleoresins as commercially produced very in their pigment are of the contact with the color value ranging from about 30,000 to 1,00,000 units as, measured by the method prescribed by the Essential oil Association of America (EOA). The oleoresin color content is directly proportional to the pigment concentration the raw material used. But preparation of oleoresin with high color value is desirable. The present invention relates to a process to upgrade the color value of pungency-free commercial chilli oleoresin.

There are several patents on chilli/paprika color, relating to the following aspects: (i) Methods for alcohol or oil extraction, usually after saponification with alkali. (ii) Pigment production by interesterification. (iii) Methods for pigment stabilization or prevention of fading and, (iv). Preparation of formulations for food use. Other patents relating to paprika color are as follows: Method of preventing paprika color from fading production of paprika color involving the use of calcium hydroxide and solvent extraction, improvement of paprika color stability to oxygen and light by blending with carrot extract and browning reaction product of a saccharide and amino acid. There are no methods reported in patent literature for the preparation of colourant from oleoresin. In particular the process is to enrich the color of pungency-free chilli and paprika oleoresin.

Reference may be made to Japanese patent JP 61264061 (1986) wherein paprika extract is treated with caustic alkali in presence of acetone to produce a dyestuff. The drawbacks are the treatment hydrolyses the fatty acid esters of carotenoid pigments, thereby altering their natural structure.

The present patent deals with pigment enrichment of chilli and paprika extracts and this approach has not been reported in earlier patents. In this patent a method is provided for the enrichment of the color value of pungency-free chilli oleoresin from the normal values (ranging from 30,000 to 70,000 EOA color units), by a physical process i.e. without changing the molecular structure of the carotenoid fatty acid esters, naturally present in chilli.

In the spice extraction Industry, chilli oleoresin is produced by extraction of chilli powder with solvents such as acetone, ethylene dichloride and hexane followed by desolventisation to get a deep red colored, viscous material called the oleoresin. The oleoresin contains the constituents responsible for color namely carotenoids, the pungent constituents mainly capsaicin and dihydrocapsaicin, besides other soluble components such as fats and waxes. This preparation is further processed by the Industry to obtain two products namely (i) a color fraction free of pungency and (ii) a pungent fraction containing low levels of color. It is the first fraction (color fraction), that is useful as a colorant in foods and also for poultry feeds. The Industry aims at producing the chilli color with a high color value, but the color content gets restricted due to the natural carotenoid content in the chilli. The present patent addresses this problem and provides a method to produce a colorant of enhanced color content, which will be useful especially in colorant formulations for food use.

Further some existing patents as mentioned above address the problem of enrichment of color value in chilli oleoresin, by the method of saponification wherein the natural ester bond between the carotenoids (manly capsanthin and capsorubin) and the fatty acids gets cleaved by the action of alkali to release the pigment. It is known that the solubility property of this pigment is different. It becomes almost insoluble in fatty media, necessitating formulation using emulsifiers and diluents. Also there are restrictions on the use of this altered pigment. The present patent does not face this drawback.

OBJECTS OF THE INVENTION

The main object of the present invention is to provide a process for the preparation of colorant with enhanced color value from commercially available pungency-free chilli oleoresin.

Another object of the invention is to provide a process for the preparation of colorant from chili oleoresin employing solvents, which are non-toxic and approved by regulatory authorities.

Another object of the invention is to provide a physical process for extraction form chili oleoresin to provide carotenoid-fatty esters in natural form as present in the raw material.

SUMMARY OF THE INVENTION

Accordingly, the present invention provides a process for the preparation of colorant with enhanced color value from commercially available pungent free chilli oleoresin by extracting the pungent free oleoresin with any one of alcoholic solvent, mixture of alcoholic solvents, mixture of alcohol-ketonic solvent or aqueous ketonic solvent, separating the oleoresin layer and the solvent layer, pooling the solvent layer obtained and separating the final oleoresin layer, and distilling the final oleoresin layer of step (c) to obtain pungent free oleoresin with enhanced color value.

BRIEF DESCRIPTION OF THE FIGURES

FIG. 1 shows the experimental set-up for the preparation of a colorant with high color value from pungency-free chilli oleoresin.

DETAILED DESCRIPTION OF THE INVENTION

In accordance to the objectives, the present invention provides a process for the preparation of colorant with enhanced color value from commercially available pungent free chilli oleoresin, the said process comprising steps of:

a) extracting the pungent free oleoresin with any one of alcoholic solvent, mixture of alcoholic solvents, mixture of alcohol-ketonic solvent or aqueous ketonic solvent at a temperature in the range of 0° C. to 60° C. for a time period of 30 minutes to 60 minutes, b) separating the oleoresin layer and the solvent layer by conventional method, c) repeating steps (a) and (b), pooling the solvent layer obtained and separating the final oleoresin layer, and d) distilling the final oleoresin layer of step (c) to obtain pungent free oleoresin with enhanced color value.

Another embodiment of the present invention provides an oleoresin colorant ith enriched color.

Yet in another embodiment of the present invention, the oleoresin used for extraction is selected from pungent free chilli oleoresin or paprika oleoresin associated with negligible pungency.

Still in another embodiment, the alcoholic solvent used is methanol.

Still in another embodiment, the mixture of alcoholic solvents used is methanol-isopropanol mixture.

Yet in another embodiment, the mixture of alcoholic ketonic solvent used is methanol-acetone mixture.

Yet in another embodiment, the aqueous ketonic solvent used is aqueous acetone.

Still in another embodiment of the present invention the ratio of methanol to isopropanol is in the range of 2:98 to 70:30.

Yet in another embodiment of the invention the ratio of methanol to acetone is in the range of 2:98 to 70:30.

Still in another embodiment of the present invention the ratio of water to acetone used is in the range of 5:95 to 30:70.

Yet in another embodiment of the present invention the ratio of oleoresin to solvent used is in the range of 1:3 to 1:20.

Still in another embodiment of the present invention the distillation of oleoresin is performed at a temperature in the range of 35° to 50° C. under reduced pressure.

Yet in another embodiment of the present invention the EOA color units of pungent free chilli oleoresin obtained has an enhanced value by 25.0 to 52.0%.

Still in another embodiment of the present invention, the said process may be carried out either by batch process or continuous process.

In an embodiment of the above process the solvent extraction is carried out in a semi-continuous process wherein, the oleoresin is delivered as small droplets into a stationary column containing the solvent, and the partially extracted droplets are collected at the bottom of the column and recycled repeatedly, with the help of partial vacuum created using a water pump or a vacuum pump, through the solvent in the column, till maximum enrichment of the color takes place, maintaining an overall material to solvent ratio from 1:20 to 1:50, preferably by providing gentle mixing with the help of a stirrer at the region of addition of oleoresin drawplates into the column of solvent, which is followed by desolventisation for recovery of the enriched oleoresin, and fatty oil rich fraction.

In another embodiment of the process, paprika oleoresin of negligible pungency is used as the starting material for enrichment, in place of the pungency-free chilli oleoresin.

Yet in another embodiment of the process, desolventisation is carried out initially without vacuum and subsequently under high vacuum to obtain acceptable low levels of residual solvent in the enriched oleoresin and the fatty oil rich fraction.

In yet another embodiment of the process the material of construction of the column solvent extraction can be glass or any other suitable material such as stainless steel.

Still in another embodiment of the process the recycling of the oleoresin through the solvent can be made continuous employing any suitable equipment such as the peristaltic pump, and using single or multiple columns for extraction.

Novelty

1. The process employs solvents permitted by regulatory agencies for the extraction of spices and no toxic solvents are used.
2. This is a physical process and there is no chemical change of the pigments namely carotenoid—fatty acid esters naturally present in the raw material used i.e. pungency-free chilli oleoresin
3. The process delivers a colorant of enhanced pigment content, useful for the preparation of colorant formulations.

The following examples are given by way of illustration of the present invention and should not be construed to limit the scope of the present invention.

EXAMPLE 1

Commercial grade chilli oleoresin, free of pungency (50 g of EOA color value 34,000) was taken into a round bottom flask and mixed with 150 ml of acetone containing 6% water. This was vigorously stirred for 15 min. over the magnetic stirrer at room temperature (27° C.) and allowed to stand for 10 min. for layer separation. The top solvent layer was gently decanted. Oleoresin in the flask was extracted again with 150 ml acetone-water mixture as described above. The oleoresin was subjected to distillation using a rotary evaporator at a temperature of 45° C., under a vacuum of 26" towards the end of distillation to remove the residual solvent and recover an enriched oleoresin (25.4 g) of color value 43,000.

EXAMPLE 2

Commercial grade chilli oleoresin, free of pungency (50 g of EOA color value 34,000) was taken into a round bottom flask and mixed with 150 ml of 40% acetone in methanol. This was vigorously stirred for 15 min. over the magnetic stirrer at room temperature and allowed to stand for 10 min. for layer separation. The top solvent layer was gently decanted. Oleoresin in the flask was extracted again with acetone-methanol mixture as described above. The oleoresin was subjected to distillation using a rotary evaporator at a temperature not exceeding 50° C., under a vacuum of 26" towards the end of distillation to fully remove the residual solvent and recover an enriched oleoresin (17.5 g) of color value 51,540.

EXAMPLE 3

In this method a glass column (4.5 cm×120 cm) having a stopcock at the bottom was filled with 3.10-L methanol: 100 g of commercial chilli oleoresin was taken in a separatory funnel, which was fixed over the column. Oleoresin from the separatory funnel was allowed to fall on the solvent in the column drop wise. The oleoresin collected at the bottom of the column was taken back in to the separatory funnel through a polyethylene tube, applying vacuum and recycled as depicted in FIG. 1. The process of extraction of fatty oil fraction into the solvent was continued up to 10 passes. After 10 passes, the enriched fraction and the fatty oil fraction were separated and desolventised by distillation, as described in the previous example, to obtain an enriched fraction (67g) of color value 45,870.

The Advantages of the Present Invention Are

1. The process is amenable for scale-up to larger level of handling as a batch or semi-continuous method.
2. The process can be carried out in an enclosed system, keeping the evaporation losses to the minimum.
3. The desolventisation is carried out at reduced temperatures to minimise the pigment degradation.

We claim:

1. A process for the preparation of a colorant with enhanced color value from a pungent-free oleoresin, the process comprising the steps of:
   a) extracting the pungent-free oleoresin with at least one of an alcoholic solvent, a mixture of alcoholic solvents, a mixture of alcohol-ketonic solvents or an aqueous ketonic solvent at a temperature in the range of 0° C. to 60° C. for a time period of 30 minutes to 60 minutes under atmospheric pressure, thereby forming an oleoresin layer and a solvent layer,
   b) separating the oleoresin layer and the solvent layer,
   c) repeating steps (a) and (b), pooling the solvent layer obtained and separating the oleoresin layer obtained, and
   d) distilling the oleoresin layer of step (c) to obtain the colorant with enhanced color value.

2. The process as claimed in claim 1, wherein the obtained colorant with enhanced color value is a pungent-free oleoresin with enhanced color.

3. The process as claimed in claim 1, wherein the pungent-free oleoresin is selected from a pungent-free chilli oleoresin or a paprika oleoresin having negligible pungency.

4. The process of claim 3, wherein the pungent-free oleoresin is pungent-free chilli oleoresin.

5. The process of claim 4, wherein the colorant with enhanced color value is an enriched natural red colorant suitable for food applications.

6. The process of claim 1, wherein in step (a) the alcoholic solvent is methanol.

7. The process of claim 1, wherein in step (a) the mixture of alcoholic solvents is a methanol-isopropanol mixture.

8. The process of claim 7, wherein the methanol-isopropanol mixture is in a ratio of methanol to isopropanol ranging from 2:98 to 70:30.

9. The process of claim 1, wherein in step (a) the mixture of alcoholic ketonic solvents is a methanol-acetone mixture.

10. The process of claim 9, wherein the methanol-acetone mixture is in a ratio of methanol to acetone ranging from 2:98 to 70:30.

11. The process of claim 1, wherein in step (a) the aqueous ketonic solvent is aqueous acetone.

12. The process of claim 11, wherein the aqueous acetone is in a ratio of water to acetone ranging from 5:95 to 30:70.

13. The process of claim 1, wherein in step (a) the ratio of the pungent-free oleoresin to solvent used ranges from 1:3 to 1:20.

14. The process of claim 1, wherein the distillation in step (d) is performed at a temperature in the range of 35° to 50° C. under reduced pressure.

15. The process of claim 1, wherein the colorant obtained in step (d) is pungent-free chilli oleoresin that has a color value enhanced by 25.0 to 52.0% measured in EOA color units.

16. The process of claim 1, wherein the process is carried out either by a batch process or a continuous process.

* * * * *